United States Patent [19]

Townend

[11] Patent Number: 4,917,161

[45] Date of Patent: Apr. 17, 1990

[54] CHEWING TOBACCO COMPOSITION AND PROCESS FOR PRODUCING THE SAME

[75] Inventor: John Townend, Lancaster, Pa.

[73] Assignee: Helme Tobacco Company, Helmetta, N.J.

[21] Appl. No.: 105,275

[22] Filed: Oct. 6, 1987

[51] Int. Cl.$^4$ .......................... A24B 5/06; A24B 3/07; A24B 5/04
[52] U.S. Cl. .................................... 131/352; 131/309; 131/310; 131/366
[58] Field of Search ................ 131/309, 310, 352, 366

[56] References Cited

U.S. PATENT DOCUMENTS 3,166,078  1/1965  Parmele et al. ..................... 131/366
4,620,556 11/1986  Rosson et al. ....................... 131/366

*Primary Examiner*—V. Millin
*Attorney, Agent, or Firm*—Lucas & Just

[57] ABSTRACT

A miniature plug of chewing tobacco made from 25 to 80% by weight tobacco on a dry basis and 75 to 20% casing solids and having a tensile strength of greater than 150 g/cm is disclosed. The high tensile strength allows for the miniature plug to be satisfactorily processed. Such a plug can be made with the use of gelatin in the casing solution. The casing includes as an essential element gelatin.

18 Claims, No Drawings

CHEWING TOBACCO COMPOSITION AND PROCESS FOR PRODUCING THE SAME

The present invention relates to smokeless tobacco and more particularly to chewing tobacco and a process for making a miniature soft plug without the use of a masticatory.

Smokeless tobacco products can be classified into three main types: moist snuff, dry snuff and chewing tobacco. Generally, chewing tobacco is sold in one of three forms: a "plug" where the tobacco is compressed into any one of a number of shapes; twists where leaves are entwined into a shaped product; and "loose leaf" where the tobacco is not compressed or shaped but presented to the consumer loose in a pouch. Plugs are generally divided into two categories, soft plugs and hard plugs. The hard plugs typically have a moisture content generally 15% or less while the soft plugs have a higher moisture content.

Typically, chewing tobacco is made by cutting tobacco into strips of suitable size; dipping the cut tobacco in a casing solution; partially drying the cased tobacco; holding the tobacco in containers for a bulking period; and finally packaging it. Generally the tobacco has been fermented and aged prior to the cutting step.

Chewing tobacco no matter what form it is sold in comes in a package from which individual portions or chews must be removed. Once the packaging is opened, air comes in contact with the tobacco and starts to dry it out. As the tobacco starts to dry out, it loses its desirable chewing tobacco characteristics.

In 1877, U.S. Pat. No. 189,604 suggested coating a block of leaf or cut tobacco with an elastic gelatinous material to prevent the tobacco from going stale. The coating step took place either before or after wrapping the block in paper. The gelatinous material was a mixture of gelatin, honey and gum arabic. The purpose of such coating was to protect the tobacco from the deleterious influence of humid sea air during ocean shipment and to provide a waterproof protective packaging. Clearly, this was a forerunner to inexpensive, modern-day, air-tight packaging.

Later, in 1921, U.S. Pat. No. 1,376,586 suggested covering a tobacco tablet with chicle to prevent the tobacco from going stale. Chicle, which is a natural gum, formed a unitary protective coating around the tobacco tablet. Chicle acts as a masticatory with the tobacco.

An individual portion or miniature plug is a highly desirable form in which to sell chewing tobacco. From a sanitary standpoint, the individual chew prevents the objectionable practice of one tobacco chewer biting off a chew from the plug or twist of another, or dipping his fingers into another's pouch of loose leaf tobacco. Such practices are recognized sources of disease transmission. The individual chew also provides the advantage that the tobacco stays fresher because the individual chew can be individually wrapped. The tobacco remains sealed in its package right up to the point where the user removes it from the package. Additionally, the individual package can be marked with the manufacturer's trademark so that each time the user goes for a chew he sees the full mark of the manufacturer. With a regular, multiple chew plug, the manufacturer's mark is virtually obliterated once the package is opened.

It has been found that by using tobacco dipped in conventional casing solutions containing syrup sweeteners, salt, flavoring and preservatives that the cased tobacco cannot be used to produce an acceptable miniature soft plug. A miniature soft plug cased with a conventional casing solution does not have the needed durability to withstand further processing and packaging. In short, the plug falls apart.

U.S. Pat. No. 4,545,392 suggests that to decrease the break-up of a soft plug that a water insoluble natural and/or synthetic gum be added to the tobacco. Such gum is added after the casing step and acts as a masticatory.

The use of masticatories with chewing tobacco is well known. Masticatories are water insoluble synthetic and/or natural gums which may generally be mixed with cased tobacco just prior to packaging. Natural gums that are used as masticatories include chicle, candelilla wax, and beeswax. Typical synthetic masticatories are polyurethane, butyl rubber and polyvinyl acetate. The use of a masticatory with chewing tobacco is not widespread because of poor mouth feel and interference with the attractive flavor and aroma of the tobacco product. Therefore, most conventional chewing tobaccos are made without natural or synthetic gums and whatever stickiness is desired is provided by the humectants, saccharides, licorice and other components in the casing solution.

Applicant has now discovered that a miniature soft plug of chewing tobacco can be made without the use of water insoluble natural and/or synthetic gums. Applicant has discovered that if the miniature plug made from partially dried cased tobacco has a tensile strength greater than about 150 grams/cm when measured at a moisture content of about 26% by weight, then the miniature plug withstands further processing and does not fall apart. Miniature plugs from conventionally cased tobacco were found to have a tensile strength below about 100 grams/cm when measured at 26% by weight moisture and fall apart during subsequent handling and processing to a final package. The miniature soft plug of the present invention has a durability that allows it to hold together during these processing steps.

Broadly, the miniature plug of the present invention has a moisture content between about 15 to about 35% by weight and comprises about 25 to about 80% by dry weight tobacco, about 20 to about 75% by dry weight casing solids, and has a tensile strength greater than about 150 g/cm when measured at a moisture content of 26% by weight. Moisture content was determined by measuring the weight of a 5 to 10 gram sample of the tobacco product in a dish (9 cm diameter×2 cm high), drying the sample in a forced draft oven for a period of 4 hours at 103° C. and then reweighing the dried tobacco sample. The moisture content is determined from the differences in the weights of the tobacco product divided by the initial weight of the tobacco product and the quotient times 100.

Preferably, the miniature plug of the present invention has a moisture content between about 18 to about 30% by weight. Most preferred the miniature plug has a moisture content of about 20 to about 27% by weight.

The amount of tobacco in the miniature plug of the present invention was preferably about 30 to about 60% by dry weight and even more preferred was a miniature plug having tobacco in an amount of about 36 to about 51% dry weight.

The preferred amount of casing solids on the miniature plug of the present invention was about 40 to about 70% by dry weight and most preferred was a miniature plug having about 49 to about 64% by dry weight casing solids.

The tensile strength of the miniature plug of the present invention was preferably greater than or equal to about 200 g/cm and most preferred was a tensile strength greater than or equal to about 220 g/cm, both of these measurements being made on a miniature plug having a moisture content of about 26% by weight. Tensile strength is a convenient way to measure the durability of the plug.

Generally, it has been found that the tensile strength increases with a decrease in moisture. When the tensile strength of the miniature plug of the present invention was measured at a moisture content of about 20% by weight, the tensile strength was greater than about 300 g/cm, more preferred greater than or equal to 400 g/cm and most preferred greater than or equal to about 450 g/cm.

In order to produce the miniature plug of the present invention having its exceptional durability without the need of a water insoluble gum, cut tobacco was dipped into a casing solution containing gelatin in an amount of about 1% to about 10% by weight of solution. Preferably, the casing solution contained about 1% to about 5% by weight of solution of gelatin and good results have been obtained with a casing solution containing gelatin in an amount of about 3% by weight.

Gelatin is a heterogenous mixture of water soluble proteins of high average molecular weight that is obtained from collagen. Collagen is obtained by boiling skins, tendons, ligaments, bones and other parts of animals in water.

The use of gelatin in the aqueous casing solution provides a number of surprising and unexpected advantages. The gelatin does not interfere with the flavor and aroma of the tobacco product. The gelatin provides good mouth feel because it readily dissolves in the user's mouth. Gelatin has been found to provide an exceptionally high degree of adherence between the strips of tobacco. This is in contrast to conventional casing solutions where the cohesiveness is low. Gelatin was also highly advantageous to work with during the casing step because its incorporation into the hot casing solution results in minimal increase in viscosity. Most other water soluble gums if applied during the casing step would raise the viscosity to unworkable levels. It has also been found that the miniature plug made by the present invention has many of the attributes of loose leaf chewing tobacco. The gelatin in the plug readily dissolves once it has been placed in the user's mouth and gives the user the sensation of loose leaf.

An embodiment of the miniature plug of the present invention has a moisture content between about 15 to about 35% by weight and comprises about 25 to about 80% by dry weight tobacco, about 20 to about 75% by dry weight casing solids, and about 0.5 to about 5% by dry weight gelatin.

The amount of gelatin in the miniature plug of the present invention was more preferably about 0.5 to about 2.5% by dry weight and most preferred was a gelatin content of about 1 to about 2% by dry weight.

The amount of tobacco in the miniature plug of the present invention was preferably about 30 to about 60% by dry weight and even more preferred was a miniature plug having about 36 to about 51% dry weight.

The preferred amount of casing solids on the miniature plug of the present invention was about 40 to about 70% by dry weight and most preferred was a miniature plug having about 49 to about 64% by dry weight casing solids.

A method for preparing a miniature plug in accordance with the present invention comprises thrashing the tobacco to a suitable size, dipping the tobacco in a casing solution that contains gelatin, partially drying the cased tobacco, bulking it for a period, compressing the partially dried cased tobacco into thin slabs; cutting the slabs into miniature plugs and finally packaging the miniature plugs.

The type of tobacco used in chewing tobacco is typically air cured which is subsequently fermented and aged. The tobacco used in the present invention is a blend of air cured tobaccos.

The thrashing step was accomplished in a conventional manner. A thrashing machine was used which not only cut the tobacco leaves but also removed stems from the leaves. A portion of the stems were rolled or flattened in a conventional manner and added back to the cut tobacco in a subsequent step prior to casing.

The thrashed tobacco was then moved by conveyor belt to the casing step.

The casing solution was prepared by dissolving the casing components including gelatin in hot water. The casing solution is held in a tank maintained at a temperature between about 60° C. to about 95° C., preferably about 75° C., under agitation. The viscosity of the casing solution was in the range of about 30 to about 70 centipoises and more preferably about 40 centipoises. These viscosities were measured at 25° C.

The tobacco was treated with the casing solution in a conventional manner by passing it through a trough in which it was immersed in the casing solution and picked up by a paddle wheel onto a conveyor where excess casing was squeezed from the tobacco with the excess casing being returned to the trough.

Preferably, the tobacco prior to entering the casing trough had a moisture content of about 25% by weight and left the casing trough with a moisture content of about 37% by weight and had about 50 to about 58% dry weight casing solids.

The drying step was accomplished in a known manner. Good results were achieved by hot air dryers to drop the moisture of the cased tobacco down to about 25% by weight.

The partially dried tobacco was bulked in large cases holding about 1400 to about 1800 pounds each of tobacco for at least about 2 days. It was then spread on a press bed uniformly to preferably about 0.72 g/cm². Typically it had a thickness of about 2 cm.

Next, the layer of tobacco was compressed into thin slabs. Good results were obtained when the layer was compressed by about 50% to a thickness of about 0.8 cm in thin slabs that measure about 38 cm by 38 cm.

After the cased tobacco was pressed, it was stored in this compressed state for a period of greater than about 12 hours and preferably for a period of greater than or equal to about 24 hours. Longer periods of time can be employed. Good results were obtained when the slab was stored in a vacuum bag. Such a bag maintained the slab in a compressed state. Additionally, good results were obtained when the compressed slab was stored in a cool environment. Such a cool environment solidifies the gelatin. Preferably, the compressed slab was stored at a temperature below 16° C. and more preferred at a temperature of about 6° C. It was found that such cold storage greatly improves the strength of the slab so that the slab does not fall apart during the cutting step. A conventional press was used to compress the tobacco. Good results were obtained with a pressure of about 200 psi.

The pressed slab was then subjected to a cutting step where the slab was cut into miniature plugs that preferably measure about 4 cm by about 1.6 cm by about 0.8 cm using a conventional cutting machine. Good results were obtained with a caramel cutter manufactured by W. C. Smith Inc., Philadelphia, Pa.

The individual miniature plugs were then packaged in a conventional manner.

The casing solution was an aqueous solution of flavorings, sweeteners, preservatives, salt and syrup. More specifically, the casing solution included corn syrup, sugars such as sucrose, molasses, salt, humectants such as glycerine, licorice and generally one or more preservatives such as sodium benzoate and the like.

The casing solution comprised about 40% water and about 60% of a casing solids composition that comprised flavorings, sweeteners, salt, preservatives and syrups. The range of water was about 35 to about 55% by weight and the range of casing solids composition was about 65 to about 45% by weight. The miniature plug of the present invention was made by including in the casing solution gelatin in an amount of about 1% to about 10% by weight based on the weight of the casing solution. More preferably about 1% to about 5% by weight gelatin was included and good results were obtained with the inclusion of about 3% by weight gelatin. The Bloom of the gelatin employed in the present invention may vary widely, although the lower Bloom gelatin, say 150 Bloom, requires a greater quantity of gelatin in the casing solution than the higher Bloom gelatins such as 300 Bloom.

For example, good results were found when the amount of 300 Bloom gelatin present in the miniature plug was about 1.0% by weight dry basis while with 200 Bloom gelatin, good results were obtained when the amount of gelatin in the miniature plug was about 1.6% by weight dry basis. It was preferred that the Bloom of the gelatin used in the present invention be at least about 100, more preferred about 200 to about 400. Good results were obtained with a gelatin having a Bloom of about 300. Bloom is a conventional numerical designation which distinguishes gelatin on a gel strength basis.

The pH range of the casing solution ranges from about 2 to about 10. It was preferred that the pH of the casing solution be on the acid side, e.g. about 4.5 to about 7.

In order to prepare a casing solution in accordance with the present invention, water was mixed in a heated tank with gelatin and other ingredients. The other ingredients added to the casing solution were flavorings, sweeteners, preservatives, salt and syrups. Mixing was accomplished with a conventional stirring mechanism. Heat was conventionally supplied to the tank through heating coils. The casing solution was maintained at a temperature from about 60° C. to about 95° C. at a viscosity between about 30 to 70 centipoises measured at 25° C. to facilitate applying the casing to the tobacco.

In order to measure the tensile strength in accordance with the specification and claims of the present invention, the following laboratory procedure was employed. The tobacco was prepared for casing in a conventional manner. The casing was carried out by dipping the tobacco into a casing solution and then squeezing out excess casing with a wringer followed by oven drying to a final moisture content of either 20% by weight or 26% by weight. Once the appropriate moisture was obtained, the cased tobacco was placed in a plastic bag for a minimum of 12 hours at 40° C. to simulate bulking. It was then removed from the bag and evenly distributed onto a press bed such that it was 0.72 g/cm$^2$ over the area of the bed. Typically, the thickness of the cased tobacco layer before pressing was about 1.6 cm. Next, the spread, cased tobacco was subjected to an even pressure of about 720 psi for a period of about one minute. At the end of one minute, the pressure was released and then the same pressure was reapplied for another one minute period. This was repeated so that the spread cased tobacco had been subjected to a one minute press of 720 psi a total of four times.

Once this pressing was completed, the pressed slab was clamped between two steel plates for a period of 12 hours to prevent expansion. At the end of the 12 hour period strips were cut that are 1.6 cm in width. Typically, the strip will be about 0.8 cm in depth. The strip was over 5 cm long. Finally, these strips were placed in a Scott Tensile Tester Model X5 manufactured by Scott Manufacturing The distance between the clamp jaws was 5 cm. The Scott tensile tester was operated in a conventional manner. The tensile strength that was measured was the force needed to pull the tobacco strip apart. Such force is given in grams. The actual force can be calcuated by multiplying the number of grams times gravity.

It should be noted that the samples of cased tobacco prepared and tested in accordance with the present invention required the jaws of the Scott Tensile Tester to be modified to allow them to open wide enough for inserting and clamping the tobacco sample.

These and other aspects of the present invention may be more fully understood with respect to the following examples.

EXAMPLE 1

This example illustrates preparing a miniature plug in accordance with the present invention.

Pennsylvania and Wisconsin air cured tobaccos were each subjected to bulk fermentation, aging and then subsequently steamed at about 93° C. for 6 to 8 hours. This increased the moisture content of the tobaccos to between 25% to 27%. Next, the tobaccos were blended and subjected to a thrashing machine which cut the tobacco and removed virtually all the stem. The stem was then flattened and a portion of the stem added back to the tobacco. This cut tobacco was then taken by conveyor belt to a casing solution trough for treatment with the casing solution. An aqueous casing solution was prepared using a formulation that comprised 40% by weight water, and about 60% by weight of casing solids composition comprising flavoring, molasses, sucrose, corn syrup, salt and preservatives. The casing solution had a viscosity of about 40 centipoises at 25° C. This solution was prepared in a tank that was maintained at a temperature of 74° C. A stirring shaft was mounted with a standard propeller and operated in a conventional manner to stir the casing solution. This casing solution included 3% by weight of gelatin having a Bloom of 300. The cut tobacco was fed to the trough by a conveyor belt where a paddle wheel type device moved the tobacco through the trough onto a conveyor where the excess casing was squeezed out of the tobacco. The squeezed tobaccco removed from the trough had a moisture content of about 37%. The casing solution that was squeezed out of the cased tobacco was returned to the trough.

Next, the squeezed cased tobacco was subjected to a hot air dryer which dropped the moisture down to between 25% to 27%. This partially dried tobacco was then placed in carts of about 1400 to 1800 pounds each capacity for bulking for a minimum of 2 days. It was then sprayed with inhibitors to prevent bacterial growth. Next, it was distributed onto the bed of a swivel press so that 1150 grams were spread evenly on the 1600 $cm^2$ area of the bed of the press. Then, the tobacco was subjected to a compression step in which 200 psi pressure was applied to the tobacco to compress it by 50%, i.e. the depth of the tobacco went from 1.25 cm to 0.6 cm. This compression step was then repeated. Both times the compression was applied for about five minutes. The compressed tobacco was then vacuum packed in a plastic bag and placed into cold storage for 24 hours at a temperature of 6° C.

Finally, the slabs of tobacco were cut using a conventional caramel cutter to a size of about 4 cm×1.6 cm×0.6 cm. The miniature plug made in accordance with this example had typically a moisture content of about 26% by weight and the following typical analysis:

TABLE I

|  | % by Weight Dry Basis |
|---|---|
| Tobacco | 40 |
| Gelatin | 1.6 |
| Other Casing Solids Components | 58.4 |

EXAMPLE 2

This example illustrates the exceptional tensile strength of the present invention.

Table II below illustrates the values obtained from the present invention as compared to conventional products.

TABLE II

| Miniature Plug | Tensile Strength grams/cm | |
|---|---|---|
|  | 20% Moisture | 26% Moisture |
| 1. Cased Tobacco | — | 69.4 |
| 2. Cased Tobacco with Gelatin | 456 | 240 |
| 3. Cased Tobacco with Guar Gum | 62.5 | 25 |
| 4. Cased Tobacco with Hydroxypropyl Methyl Cellulose | — | 45 |
| 5. Levi Garrett Plug | 99.4 | 37.5 |
| 6. Red Man Plug | 95.7 | 49.4 |

Samples 1–4 all used identical conventionally prepared tobacco that was cased in an identical manner using the same casing solution except that the solution used to make Sample 2 had about 3% by weight gelatin added to the solution and the solution used to make Sample 3 had about 1% guar gum added to it. Sample 4 casing solution contained about 4% hydroxypropyl methyl cellulose. The casing of Samples 1–4 was carried out according to a laboratory procedure by dipping the tobacco into a casing solution and then squeezing out excess casing with a wringer. The dripping and wringing was followed by oven drying to a final moisture content of either 20% by weight or 26% by weight. Once the appropriate moisture was obtained, the cased tobacco was placed in a plastic bag for a minimum of 12 hours at 40° C. to simulate bulking.

Samples 5 and 6 were made from conventional soft plugs packaged in multiple chew blocks. The test samples were made by dismembering the soft plug and adjusting the moisture content to the indicated range of 20% or 26%.

Each cased and bulked tobacco sample at the appropriate moisture, was evenly distributed at 0.72 g/cm² on a press bed. Next the tobacco was pressed into slabs using 720 psi for a period of one minute. The pressure was then released and the same pressure reapplied three additional times for an interval of one minute each. Each pressed slab was then sandwiched between two steel plates and clamped for a period of over 12 hours to prevent expansion of the tobacco slab. After clamping, the slabs were cut by hand into 1.6 cm wide strips for testing. The strips had a cross section of 1.6 cm by about 0.6 cm.

To test the tensile strength of the 1.6 cm strips of cased tobacco, a Scott Tensile Tester was used. The distance between the clamp jaws was 5 cm. The sample was placed in the jaws and locked therein. Next the samples were pulled apart and the amount of force needed to do so was measured. The Scott Tensile Tester was used in according with its owner's manual. These values are listed in Table II above.

The miniature plug of the present invention, Sample 2, had about 1.3% by dry weight gelatin. The miniature plug of Sample 3 had about 0.3% by dry weight guar gum. Sample 4 had about 1.74% by weight hydroxypropyl methyl cellulose.

In attempting to get the same add on level of guar gum as gelatin, it was found that the casing solution thickened as more guar gum was added to the solution and made it impossible to satisfactorily dip the tobacco. It was also noted that the hydroxypropyl methyl cellulose produced a casing solution with a high viscosity. The viscosity of the casing solution containing gelatin was 65 centipoises while the viscosities of the casing solution containing guar gum and hydroxypropyl methyl cellulose were 107 and 95 centipoises, respectively. The viscosities of the casing solution without gelatin, Sample 1 in Table II above was 37.5 centipoises. All viscosities were measured at 25° C.

It was truly surprising and unexpected that gelatin produced such a superior product compared to the guar gum and hydroxypropyl methyl cellulose. It was also surprising and unexpected that the guar gum and hydroxyrpopyl methyl cellulose produced a product with a lower tensile strength than the tobacco cased with conventional casing solution.

The conventional casing solution contained sweeteners such as sucrose, syrups such as molasses and corn syrups, salt, flavorings and preservatives.

It will be understood that it is intended to cover all modifications and changes in the preferred embodiment of the present invention herein chosen for the purpose of illustration which do not constitute a departure from the spirit and scope of the invention.

What is claimed is:

1. A miniature soft plug of chewing tobacco having a moisture content between about 15 to about 35% by weight and a tensile strength of greater than about 150 g/cm when measured with a Scott Tensile Tester at a moisture content of 26% by weight, said plug comprising tobacco in an amount of about 25 to about 80% by weight dry basis; and a casing solids composition adhering to said tobacco in an amount of about 20 to 75% by weight dry basis.

2. The miniature soft plug of claim 1 wherein the tensile strength is greater than about 200 g/cm.

3. The miniature soft plug of claim 1 wherein the tensile strength is greater than or equal to about 220 g/cm.

4. The miniature plug of claim 1 wherein the tensile strength is greater than 300 g/cm when measured with a Scott Tensile Tester at a moisture content of about 20% by weight.

5. The miniature plug of claim 1 wherein the tensile strength is greater than or equal to about 450 g/cm when measured with a Scott Tensile Tester at a moisture content of about 20% by weight.

6. The miniature soft plug of claim 1 wherein said casing is comprised of flavoring, sweeteners, syrups and gelatin.

7. A miniature soft plug of chewing tobacco having a moisture content between about 15 to about 35% by weight and a tensile strength of greater than about 150 g/cm when measured with a Scott Tensile Tester at a moisture content of 26% by weight, said plug comprising tobacco in an amount of about 25 to about 80% by weight dry basis; and a casing solids composition adhering to said tobacco in an amount of about 20 to about 75% by weight dry basis, said casing comprising flavoring, sweetener, syrups and gelatin, said gelatin being present on said miniature plug in an amount of about 0.5% to about 5.0% by weight dry basis.

8. The miniature plug of claim 7 wherein the tensile strength is greater than or equal to about 220 g/cm.

9. The miniature plug of claim 7 wherein the tensile strength is greater than or equal to about 450 g/cm when measured with a Scott Tensile Tester at a moisture content of about 20% by weight.

10. A smokeless tobacco composition for use as a chewing tobacco comprising: tobacco in an amount of about 25% to about 80% by weight dry basis, a casing solids composition adhering to said tobacco in an amount of about 20 to about 80% by weight dry basis, said casing composition comprising flavorings, sweeteners, salt, syrups and as an essential ingredient therein gelatin in an amount of about 0.3 to about 5.0% by weight dry basis composition.

11. The smokeless tobacco composition of claim 10 wherein said gelatin is present in an amount of about 0.5 to about 2.5% by weight dry basis composition.

12. The smokeless tobacco composition of claim 10 wherein said gelatin is present in an amount of about 1 to about 2% by weight dry basis composition.

13. A casing solution for chewing tobacco comprising water in an amount of about 35 to about 55% by weight, about 6 to 45% by weight of a flavoring composition comprising sweeteners, salt, flavorings, syrups, and as an essential ingredient therein gelatin in an amount of about 1 to about 10% by weight.

14. The casing solution of claim 13 wherein the gelatin is present in an amount of about 1 to about 5% by weight.

15. A method for casing a smokeless tobacco for use as a chewing tobacco comprising the steps of:
(a) cutting tobacco into strips;
(b) dipping said tobacco strips into a casing solution comprising water, flavoring, salt, sweetener, syrup and as an essential ingredient gelatin; and
(c) drying said dipped tobacco strips.

16. The method of claim 15 wherein said casing solution is maintained at a temperature between about 60° to about 95° C.

17. The method of claim 15 wherein said gelatin is present in said casing solution in an amount of about 1 to about 10% by weight.

18. The method of claim 17 wherein said gelatin is present in an amount of about 3% by weight.

* * * * *